United States Patent [19]
Becker et al.

[11] 3,910,419
[45] Oct. 7, 1975

[54] DRIVE FOR MOVABLE ELEMENTS SUCH AS RAMS AND TONGS IN A MACHINE FOR MAKING BOTTLES AND SIMILAR CONTAINERS FROM PLASTICIZABLE MATERIAL

[75] Inventors: Kurt Becker, Obernkirchen; Hans-Georg Seidel, Rinteln, both of Germany

[73] Assignee: Hermann Heye, Obernkirchen, Germany

[22] Filed: Apr. 7, 1972

[21] Appl. No.: 242,054

[30] Foreign Application Priority Data
Apr. 14, 1971 Germany............................ 2118132

[52] U.S. Cl................................ 214/1 BC; 198/210
[51] Int. Cl.²........................................... B66C 1/62
[58] Field of Search.. 214/1 BC, 1 BH, 1 BD, 1 BV; 198/210

[56] References Cited
UNITED STATES PATENTS

| | | | |
|---|---|---|---|
| 2,359,433 | 10/1944 | McNamara.................... | 214/1 BH X |
| 2,833,434 | 5/1958 | Stover............................. | 214/1 BH |
| 3,200,964 | 8/1965 | Eldred............................ | 214/1 BC |

*Primary Examiner*—Robert J. Spar
*Assistant Examiner*—George F. Abraham
*Attorney, Agent, or Firm*—Michael S. Striker

[57] ABSTRACT

In a machine for making bottles or similar containers, from vitreous or plastic material in which a plurality plungers or of rams and tongs cooperating with molds are connected to a turntable for movement with the latter about the axis thereof, a drive for moving the ram parallel to the turntable axis toward and away from the respective mold and the tongs between open and closed positions for holding neck molds and the other mold parts coaxially aligned. The drive for the rams comprises a first cam track arranged stationarily about the axis of the turntable and a roller follower for each ram to move the latter toward and away from the respective mold during movement of the followers along the first cam track and the drive for the tongs comprises a second cam track also arranged stationarily about the turntable axis and a roller follower for each tongs to move the latter between open and closed positions during movement of the roller followers of the tongs along the second cam track. In order to relieve the cam tracks and the followers from excessive strains, to reduce wear of these elements and to make the connection between the follower and the movable elements operated by the same as light as possible to reduce mass forces during fast operation of the machine, a servomotor is arranged between each of the followers and the element moved thereby. Each servomotor is controlled so that the main forces for moving these elements are provided by the respective servomotors.

18 Claims, 13 Drawing Figures

DRIVE FOR MOVABLE ELEMENTS SUCH AS RAMS AND TONGS IN A MACHINE FOR MAKING BOTTLES AND SIMILAR CONTAINERS FROM PLASTICIZABLE MATERIAL

BACKGROUND OF THE INVENTION

The present invention relates to a drive for movable elements, for instance plungers or rams and tongs in a machine for making bottles or similar containers from vitreous or plastic material in which these elements are moved by roller followers movable relative to cam tracks. The term "movable element" as used in the specification and the claims is to be understood as an element which reciprocates or moves between an open and a closed position.

In known drives of this type a roller follower provides all drive forces and drive moments for moving the movable element. This results, especially if the machine is operated at high speed, and the thereby produced great mass forces in the movable elements, that all parts of the drive have to be heavily dimensioned. Such necessarily heavily constructed machine elements will result in additionally increased mass forces which will produce considerable stresses and considerable wear on the machine elements. In addition, the reaction forces between the rollers and the cam tracks and vice versa will result in undesirable non-uniform operation or vibrations of the machine.

SUMMARY OF THE INVENTION

It is an object of the present invention to overcome the above-mentioned disadvantages in drives of such elements.

It is an additional object of the present invention to provide for a construction in which the members of the drives may be held as light as possible, to increase the useful life of these members and to permit increase of the drive forces, the drive moments as well as the acceleration and deceleration of the movable elements.

It is a further object of the present invention to reduce the reaction forces between the roller followers and the cam tracks as much as possible.

With these and other objects in view, the drive for a movable element in a machine for making bottles or similar containers from plasticizable material mainly comprises a cam track extending along a predetermined path, cam follower means movable along the cam track and cooperating with the element for moving the latter in a predetermined direction during movement of said element and the cam track relative to each other, servomotor means between the cam follower means and the movable element, and means for controlling the servomotor to lower the load on said cam follower means.

In this way the drive is purposely divided in a mechanical pilot drive and the drive by the servomotor which will produce the main drive forces and moments for the movable element. In machines in which the movable element is connected to a turntable for movement with the same about the axis thereof and in which the cam track forms a closed curve about the axis of the turntable, the servomotor is controlled in dependence on the rotation of the turntable about its axis.

The servomotor is preferably a pneumatic motor, especially a pneumatic motor of the rotory vane or wing type. Such motors require due to the compressibility of the air only relatively little control means in order to follow substantially the movement imparted to the movable element by the mechanical pilot control. However, it is also possible to use electromotors or hydraulic motors as servomotors.

According to one form of execution of the present invention, the movable element comprises a plunger or ram. This ram is movable with respect to a mold by means of a ram carrier, which is mounted for movement in axial direction in guide means, and which is connected to the roller follower which in turn is coupled to the drive shaft of the servomotor. The ram carrier can thereby be connected by means of a connecting rod with a crank fixed to the drive shaft of the servomotor while a pinion fixed to the drive shaft of the servomotor meshes with a rack movable in longitudinal direction and carrying the roller follower. The largest part of the force for moving the ram carrier is thereby provided by the servomotor. The turning movement of the drive shaft of the servomotor is however positively controlled by the roller follower and the gearing connected thereto. The roller follower provides thereby in addition the necessary differential drive force for the movement of the ram carrier. In this way a very exact movement of the ram carrier is obtained and therewith an exact pressing action, for instance during pressing or performing a gob in the mold of a press-blow machine. Such a precise movement of the ram carrier is especially desirable during production of high-class, especially extremely thin walled, hollow glass containers.

According to another form of execution of the present invention the movable element comprises tongs having two sections tiltable about a pivot axis and in which the two sections of the tongs are coupled with the roller follower which in turn is coupled to the drive shaft of the servomotor. Since in this construction the main force for moving the two sections of the tongs between an open and a closed position are derived from the servomotor, it is possible to construct the elements for controlling the servomotor very light without sacrificing the precision of the movement of the tongs. The roller follower can be conncted by means of a crank and preferably further by means of a gearing between the crank and the follower with the drive shaft of the servomotor. The drive shaft of the servomotor may also be connected by means of gearing to the two sections of the tongs.

According to a further development, the arrangement includes also support means supporting the cam track and the tongs spaced in the direction of the pivot axis of the tong sections from each other and means for adjusting the spacing between the cam track and the tongs, and wherein coupling means are provided which comprise a connecting shaft operatively connected to the roller follower and means connecting the connecting shaft with the drive shaft of the servomotor for simultaneous rotation while permitting axial adjusting movement of the drive shaft and the connecting means relative to each other. This permits an axial adjustment of the tongs to adjust the position of the latter for different molds, for instance, to adjust the position of center piece halves connected to the tongs in press molds or relative to blow molds in a press-blow machine.

According to a further development, the drive of the two sections of the tongs includes a pair of cranks connected to the drive shaft of the servomotor to be driven by the latter in opposite directions and a pair of elongated lug means respectively pivotably connected at opposite ends to the pair of cranks and to the sections of the tongs and in which each of the lug means comprises axially extending pressure springs pressing the sections in the closed position against each other. Preferably one of the pressure spring means creates a greater force than the other and a stationary stop is provided which cooperates with the tongs section to which the one pressure spring means is connected. This arrangement will assure under all circumstances a positively defined positioning of the two sections of the tongs in the closed position of the latter. This arrangement is especially advantageous of the two sections of the tongs are used to hold in the closed position resiliently mounted mold parts coaxial with a closed mold.

According to a further development of the present invention, the ram carrier carries, at the end thereof facing the tongs, actuating means cooperating with closure means on the two sections of the tongs for pressing the sections against each other during movement of the carrier towards the mold. This arrangement is especially advantageous if the ram is pressed with relative great pressure towards the mold so that the ram has the tendency to open the tongs during the pressing operation.

The actuating means may comprise a claw, means mounting the claw on the ram carrier for movement in axial direction of the latter, and resilient means cooperating with the mounting means for yieldably maintaining the claw in a predetermined position relative to the carrier. Preferably, the claw may be mounted adjustable in axial direction of the carrier on the mounting means which mount the claw on the carrier.

The closure means may comprise a pair of closure arms respectively pivotally mounted between the ends thereof on the sections of the tongs in a direction transverse to a plane at which the aforementioned sections meet in the closed position, and resilient means for yieldably maintaining the aforementioned arms in a position in which the ends thereof distance from the plane are closer to the actuated means than the other ends thereof so that the arms form with the actuating means a toggle arrangement. This type of arrangement will assure pressing of the two sections of the tongs with a very great pressure against each other.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figures 1, 2:
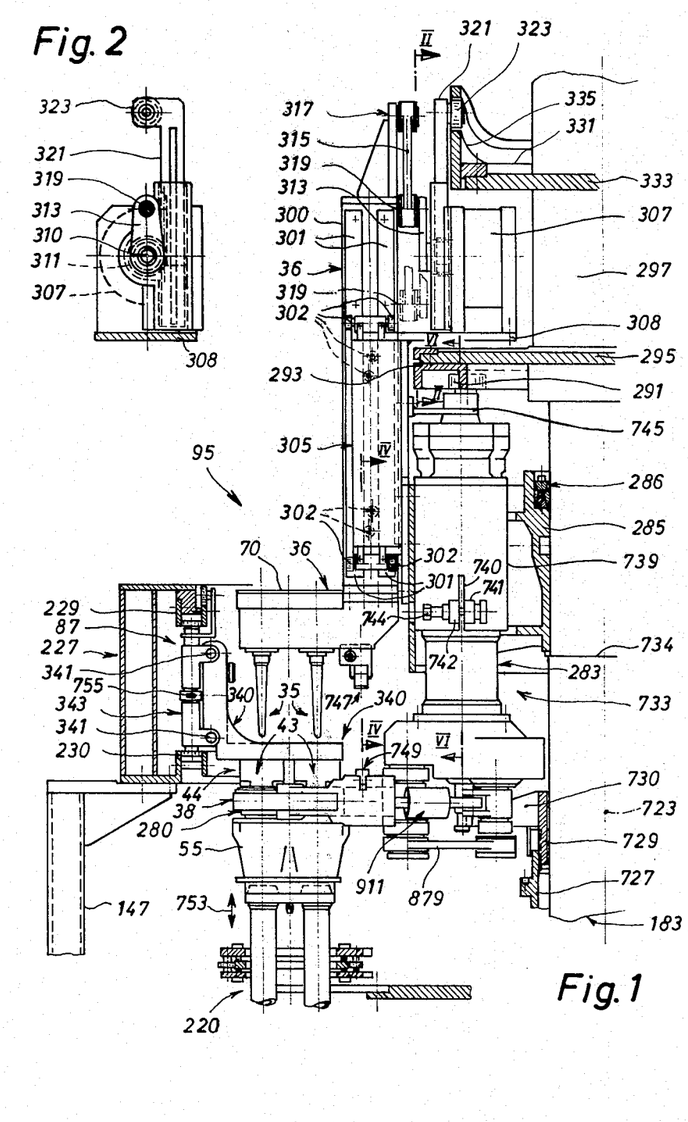
FIG. 1 is a partial longitudinal section through another embodiment of a first turntable of the machine similar to that shown in FIG. 1A.
FIG. 2 is a partial cross section taken along the line II—II of FIG. 1.
Figure 1A:
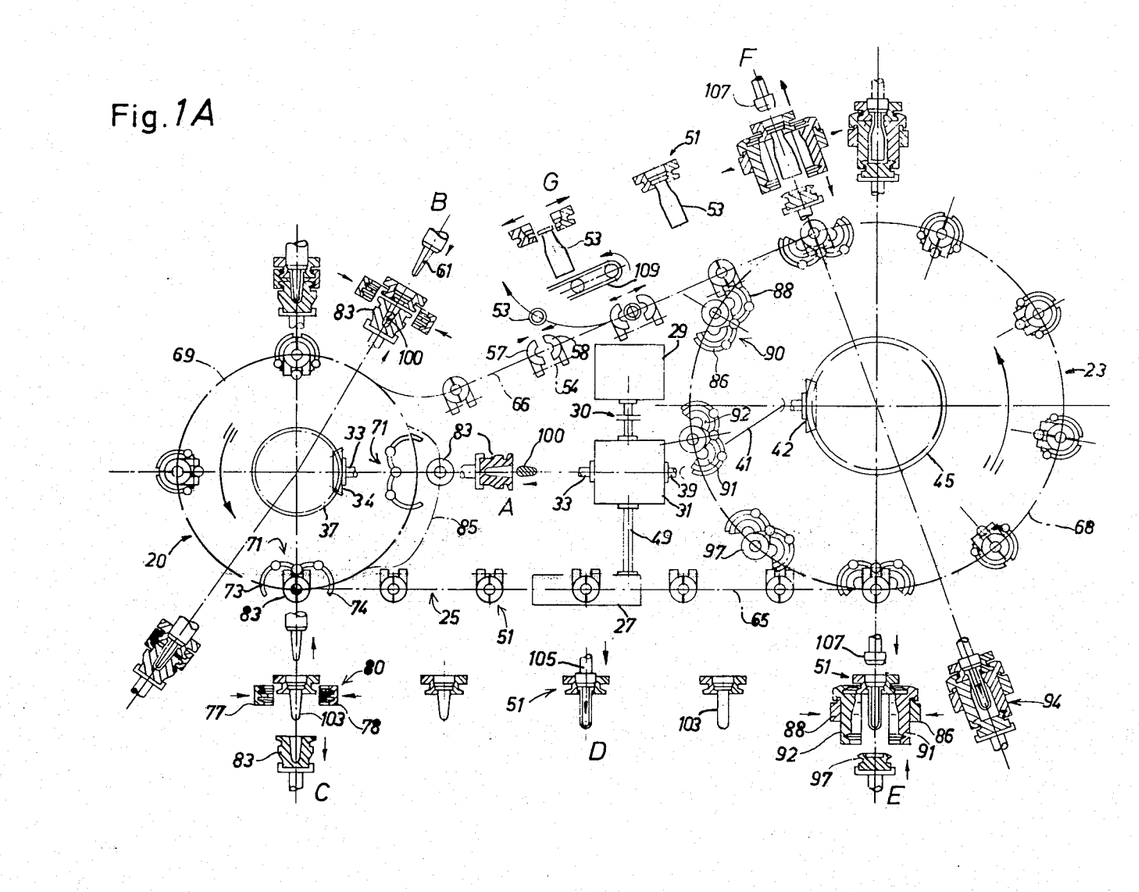
FIG. 1A is a schematic top view of a press-blow machine for forming bottles or similar containers from plasticizable material in which also various elements located vertically aligned with the elements shown in the top view are shown in a 90° flapped-over position.

FIG. 1A schematically illustrates a press-blow machine in which drive means according to the present invention for driving certain movable elements of the machine may be used. As shown in FIG. 1A, the machine mainly comprises a first turntable 20 and a second turntable 23 which are connected to each other by means of a chain 25. The turntables 20 and 23 as well as an auxiliary preform station 24 are synchronously driven by a motor 29 which is connected through a clutch 30 to a transmission 31. The transmission 31 has three output shafts, respectively numbered 33, 39 and 49 in the drawing. The output shaft 33 drives over a bevel gear 34 and a second gear 37 meshing therewith, the first turntable 20 in the direction as indicated by the arrow, the second output shaft 39 drives a cardan shaft 41 connected to a bevel gear 42 and the latter meshes with a ring gear 45 fixed to the second turnable 23 to drive the latter in the direction as indicated by the arrow, whereas the third output shaft 49 leads to the auxiliary preform station 27 and drives the latter.

The chain 25 comprises a plurality of carriages, not illustrated in FIG. 1A, which are connected to each other by likewise not illustrated connecting links. The connecting links are preferably constructed for limited elastic expansion in longitudinal direction to permit thereby a length adjustment of the chain which in the region of the turntable 20 and 23 is guided over sprocket gears respectively coaxially fixed to the turntable. Each of the aforementioned carriages carries a neck ring 51 to form the neck of hollow glass containers 53 to be produced in the machine illustrated in FIG. 1A. Each neck ring 51 comprises two neck ring sections 57 and 58 which are movable relative to each other along a shaft 54. An integral guide ring is normally suspended by means of an outer flange in the two sections 57 and 58 of the neck ring, which guide ring is for simplification reasons not shown in the drawing. The outer flange prevents that the guide ring drops out of the two sections of the neck ring during opening of the latter. The guide rings have the task to coaxially guide rams 61 in the region of the turntable 20, to bring the two sections 57 and 58 of a neck ring which are mounted with clearance on the chain 25 together in the ring axial position so as to form the upper rim of the container 53 without a radial fin which would be detrimental for proper sealing the container.

The centers of the neck rings 51 move along paths 65 and 66, shown in dash-dotted lines, and along parts of the pitch circles 68 and 69 of the two turntables 20 and 23.

The turntable 20 carries four tongs 71 each comprising two sections 73 and 74, in which corresponding halves 77 and 78 of a center piece 80 are suspended. The center pieces 80 of the tong 71 shown right and left in FIG. 1A are omitted for simplification reasons.

A mold 83 is coordinated with each of the tongs 71 and each of the molds 83 normally moves along the pitch circle 69 and is only moved radially outwardly onto a pitch circle 85 during loading of the mold with a gob.

The turntable 23 is provided with nine tongs 90 each comprising two sections 86 and 88. The two halves 91 and 92 of a center piece 94 are respectively suspended in the tong sections 86 and 88. A bottom wall 97 is also coordinated with each of the tongs 90.

As mentioned before in the brief description of the drawing, certain elements of the machine which cooperate with the molds carried by the two turntables and which are axially aligned therewith are shown in the schematic illustration of FIG. 1A flapped over through 90° relative to the elements shown in top view in FIG. 1A.

The operation of the above-described machine is as follows:

At the stage A a gob 100 of vitreous or plastic material is fed in a known manner into the mold 83. During the stage B, the pressing of the gob in the mold 83 is carried out means of a ram 61 after the tongs 71 with the center piece 80 suspended therein have clamped about and centered the neck ring 51 and the mold 83. The pressing of the gob is finished at stage C, where tongs 71 open and release the neck ring 51 with a parison 103 suspended thereon. Simultaneous therewith, the mold 83 is moved downwardly. A so-called regeneration heating, in which the temperature of the wall of the parison is equalized, occurs during movement of the parison 103 from the stage C to the stage E. At a certain point along this path the originally rigid outer skin of the parison 103 passes again in a plastic, viscous state. From this point on the parison 103 may elongate under the action of gravity. This elongation is purposely used and contributes to obtain a uniform and small wall thickness of the hollow glass container 53.

The arrangement illustrated in FIG. 1A further comprises an auxiliary preform station 27, which is not absolutely necessary, and which is provided with a blow head 105 which is movable in the direction as indicated by the arrow onto the neck ring 51 and which is moved along part of the path 65 with the respective neck ring 51. At the stage D air under pressure is blown into the parison 103 which is thereby further lengthened until the parison moves in the stage E into the meantime opened halves 91 and 92 of a center piece 94. The bottom wall 97 is then raised and the sections 86 and 88 of the tongs 90 close with the halves 91 and 92 of the center piece 94 about the neck ring 51 and the bottom wall 97, whereafter the blow head 107 is placed onto the upper end of the neck ring 51. Compressed air is then fed through the blow head 107 so as to finish form the parison 103. This forming of the parison is finished at the stage F and at this stage the tongs 90 are opened so as to release the neck ring 51 with the finished hollow container 53 suspeneded thereon. At the stage G, the neck ring is opened so that the finished container 53 drops onto a conveyor band 109 located therebeneath and is transported by the conveyor band away from the machine.

The control of the movements of the various elements on the two turntables is accomplished by control devices not illustrated in FIG. 1A, which control devices are respectively mounted on and associated with the turntables 20 and 23.

The following Figures illustrate a first turntable 95 which differs slightly from the first turntable 20 shown in FIG. 1A, and the elements carried thereby.

Figure 7:
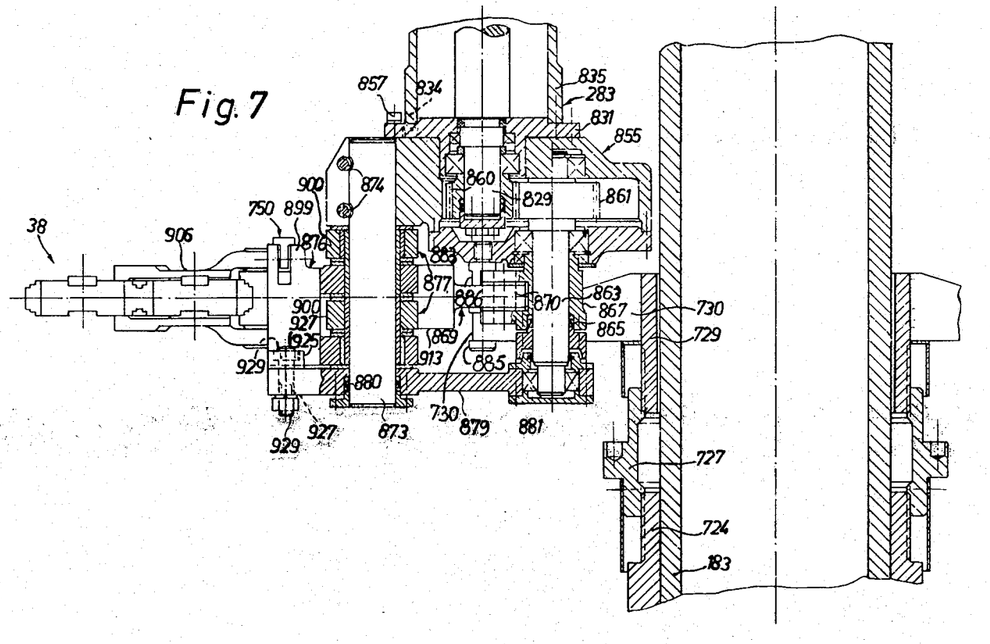
FIG. 7 is a longitudinal cross section through a part of the machine forming a continuation of the part illustrated in FIG. 6.

FIG. 1 illustrates a hollow shaft 183 turntable about a vertical axis 723, and an outer ring 724, as shown in FIG. 7, which is provided with a left-hand thread is fixedly connected to the hollow shaft 183. An adjusting ring 727 engages the outer ring 724 and the adjusting ring carries threadingly connected thereto a bracket carrying ring 729 which is provided with a right-hand thread. The bracket ring 729 is provided for each press mold with an outwardly extending bracket 730 on which tongs 38 cooperating with the respective press mold as well as a drive 733 for the tongs are mounted.

Figure 6:
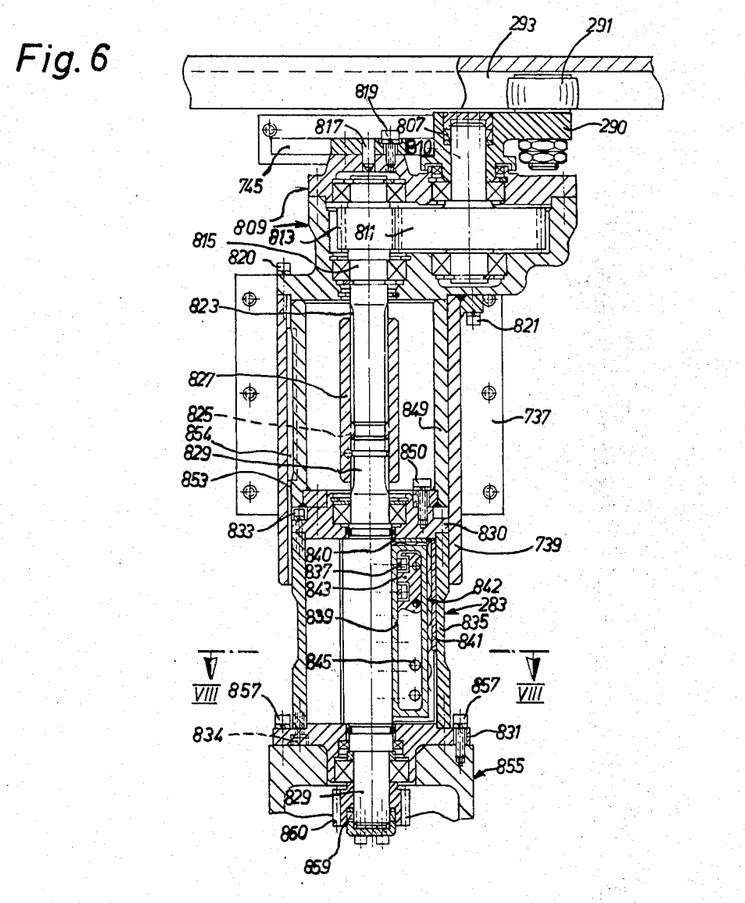
FIG. 6 is a partial cross section taken along the line VI—VI of FIG. 1.

The hollow shaft 183 carries further, upwardly spaced from the bracket carrying ring 729, a hub 285 on a shoulder 734. The hub 285 is fixed to the hollow shaft 183 by a set of conical locking rings 286. A mounting plate 737, as shown in FIG. 6, is releasably mounted for each press mold on the hub 285 and a sleeve 739 is connected to this mounting plate. Each sleeve 739 is provided at the lower end thereof with a longitudinal slot 740 and bearing blocks 741 and 742 are provided on opposite sides of this slot while a tensioning screw 744 extends through bores of the two bearing blocks. The bore in the bearing block 742 is provided with a thread so that by turning the screw 744 the sleeve may be tightened or loosened for a purpose which will be described later on in connection with FIG. 6.

A ram carrier 36 of basically L-shaped configuration is provided for each press mold. Its vertical leg 300 is provided on each of the opposite sides thereof with two rails 301 which cooperate with rolls 302 on the hub 285 fastened on a guide housing 305. Some of the rolls 302 engage the outer and some of the rolls engage the opposite sides of the guide rails 301. The ram carrier 36 is thus mounted movable in vertical direction and it obtains its drive from a pneumatic motor 307 which is mounted on an arm 308 of the guide housing 305.

A pinion 311 and a crank arm 313 (see also FIG. 2) are fixedly mounted on the drive shaft 310 of the pneumatic motor 307. A connecting rod 315 connects the outer end of the crank arm 313 with a pin on the head 317 of the ram carrier 36. The crank pin 319 is shown in full lines in FIG. 1 in its upper dead center position and in dash-dotted line in its lower dead center position.

The pinion 311 meshes, as shown in FIG. 2, with a toothed rack 321 which carries at its upper end a roller follower 323. The roller follower 323 is normally guided in a substantially horizontally extending stationarily mounted cam track 331 which is carried via plate 333 fixed to a stationarily arranged outer tube 297 surrounding the hollow shaft 183. The cam track 331 is provided with at least two lobes or rising cam portions 335 which will assure that the ram carrier 36 is positively lifted even if the supply of compressed air to the pneumatic motor 307 should accidentally fail. Such positive lifting of the ram carrier 36 is especially necessary at the locations at which the chain 87 moves in and out of the region of the turntable 95 to thus avoid a collision between the rams 35 carried at the lower end of the ram carrier 36 and the chain 87, respectively the neck rings 44 carried by the chain and extending inwardly therefrom.

The outer tube 297 is arranged, as mentioned above, coaxially about the hollow shaft 183 and is stationarily mounted in a manner not shown in FIG. 1. The outer tube 297 carries, downwardly spaced from the plate 333, a second plate 295 on which a pilot cam track 293 is mounted which is engaged by a roller follower 291 for the drive 733 of the tongs. A holder 745 for the upper part of the drive 733 is also fixed to the guide housing 305.

The ram carrier 36 is provided, as shown in FIG. 1, at its lower end with actuating means or an actuating member 747 which cooperates with closing members 749 and 750 on the tongs 38 (see also FIG. 10) to press the two sections of the tongs with considerable force against each other during movement of the ram carrier 36 toward the tongs in a manner as will be described later on.

The halves of two center pieces 280 are suspended in the tongs 38. The machine illustrated in FIG. 1 and the following Figures is provided, contrary to the showing in FIG. 1A, with so-called double molds. Each of the press molds is provided with a lifting device 220 only partially shown in FIG. 1, for movement of a mold casing 55 in vertical direction as indicated by the double arrow 753. Each of the casings 55 is provided with two press molds which are respectively axially aligned with the two rams 35 shown in FIG. 1.

The machine is further provided with a plurality of uprights 147 which are spaced from each other along the chain 87 on which a framework 227 for the ways 229 and 230 of the chain 87 is fastened. The chain 87 comprises a plurality of carriages 343 connected by preferably elastically expandable connecting links 755. Each carriage moves with its rollers in the ways 229 and 230 and is provided with two rods 341 on which the two halves of a neck ring holder 340 are mounted movable with respect to each other in a direction normal to the plane of the drawing. Two halves of neck rings 43 of neck molds 44 are suspended in each half of a neck ring holder 340.

Figure 3:
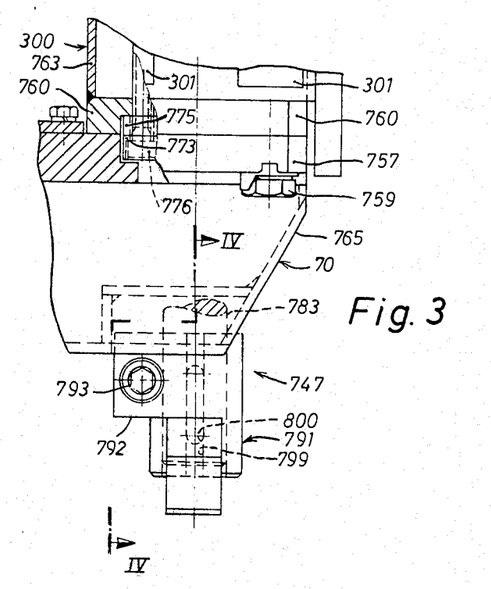
FIG. 3 is a detail drawn to an enlarged scale and showing the lower part of the ram carrier illustrated in FIG. 1.
Figure 4:
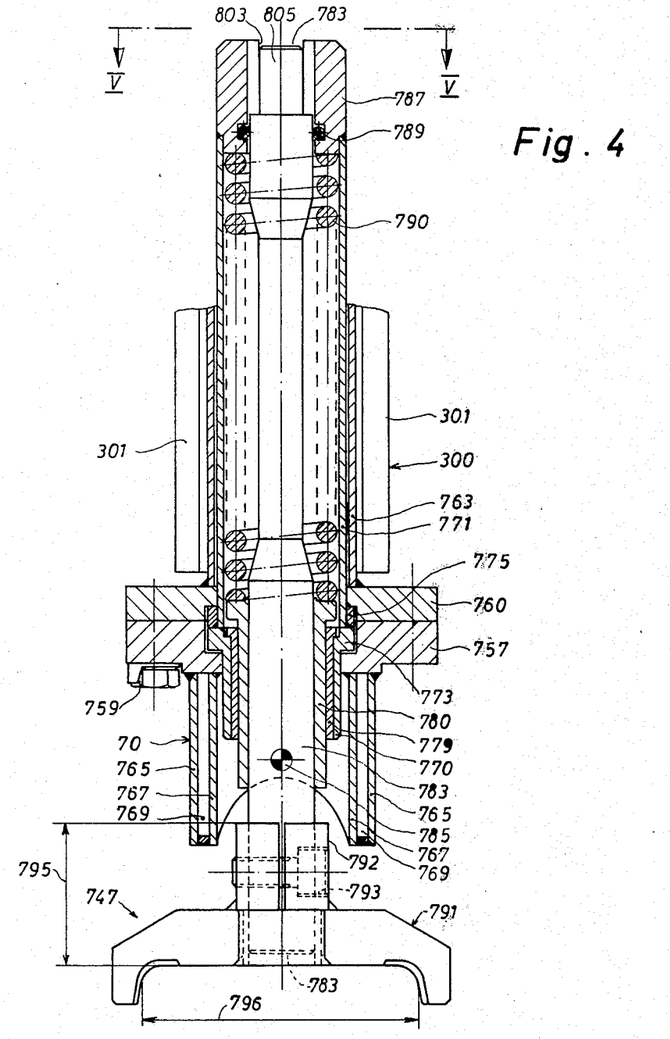
FIG. 4 is a partial longitudinal cross section taken along the line IV—IV of FIGS. 1 and 3 and likewise drawn to an enlarged scale.

A horizontal leg 70 extends laterally from the lower end of the vertical leg 300 of the ram carrier 36. The horizontal leg 70 is provided, as shown in FIGS. 3 and 4, with a plate 757 which is fastened with screws 759 to the base plate 760 of the vertical leg 300. Welded to the base plate 760 is a hollow sheet metal housing 763 of substantially rectangular cross section. As further shown in FIG. 4, as hollow sheet metal housing 765 of substantially rectangular cross section is also welded to the bottom face of the base plate 757 of the horizontally extending leg 70.

The aforementioned actuating member 747 is built into this lower part of the ram carrier 36. An inner housing 767 is for this purpose gas-tightly welded within and spaced from the lower sheet metal housing 765 and the inner housing 767 is gas-tightly welded to the base plate 757 and the sheet metal housing 765. The chamber 769 formed between the two housings is passed through with cooling air for the rams 35. The plate 757 and the base plate 760 are provided at the centers thereof with axially aligned openings in which a retaining sleeve 770 extending from the base plate 757 downwardly into the inner housing 767 and a guide tube 771 extending from the plate 760 in upward direction into the housing 763 are respectively located. The retaining sleeve 770 is provided at its upper end with a flange 773 which is connected by screws 776 (FIG. 3) with a corresponding flange 775 provided at the lower end of the guide tube 771.

A bearing sleeve 779 is located in the retainer sleeve 770 and a tubular spring retainer 780 is axially shiftably arranged in the bearing sleeve. An elongated rod 783 passes through the tubular spring retainers 780 and is connected to the latter by means of a motion transmitting pin 785. The upper end of the rod is axially guided in a head piece 787 connected to the guide tube 771 and sealed against the head piece 787 by a sealing ring 789. A coil compression spring 790 is arranged about the rod 783 between the head piece 787 and tubular spring retainer 780.

Figure 10:
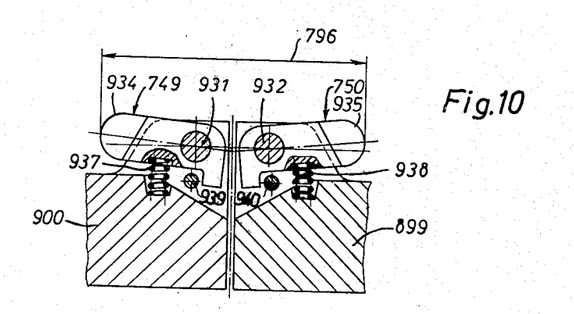
FIG. 10 is a cross section taken along the line X—X of FIG. 9.

The actuating member 747 in form of an actuating claw 791 is clamped by means of a slotted sleeve 792 and a clamping screw 793 to the lower end of the rod 783. The height 795 of the claw 791 may be varied in dependence on the distance between the tongs and the lower end of the rod in order to obtain a sufficient closing force for the tongs 38. The span of the claw 791 is designated in FIG. 4 with the reference numeral 796 and this span is also indicated in FIG. 10.

In order to assure the angular position of the claw 791 with respect to the rod 783, the slotted sleeve 792 is provided with an internal groove 799, indicated in dotted lines in FIG. 3, with which a key 800 fitted in a corresponding groove in the rod 783 cooperates.

Figure 5:
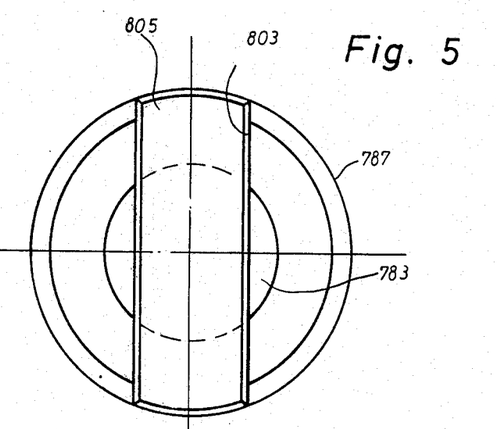
FIG. 5 is a partial top view of the arrangement shown in FIG. 4 as viewed in the direction of the arrows V—V and drawn to a further enlarged scale.

The head piece 787 is provided, as shown in FIG. 5, with a slot 803 into which a cross member 805 at the upper end of the rod 783 engages to prevent turning of the rod.

A roller follower 291 is mounted, as shown in FIG. 6, at the end of a crank arm 290 which in turn is fastened by means of a set of conical locking rings 807 on a shaft 810 which is turnably mounted in a gear case 809. The shaft 810 carries a gear 811 which meshes with a pinion 813 forming part of a connecting shaft 815, which is likewise turnably mounted in the gear case 809. The upper end of the gear case 809 is connected by means of a pin 817 and screws 819 to a holder 745, while a sleeve 739 is connected by screws 820 and 821 with the lower end of the gear case.

Figure 8:
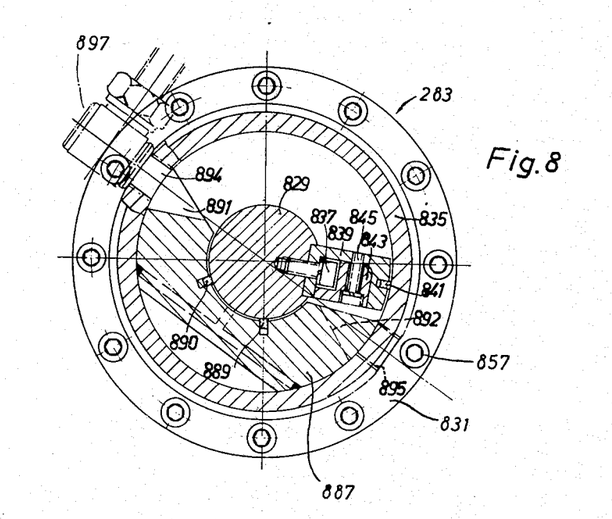
FIG. 8 is a cross section along the line VIII—VIII in FIG. 6.

The driving end of the connecting shaft 815 is provided with an outer spline 823 which is axially movable in an inner spline 825 of a coupling sleeve 827. The lower end of the coupling sleeve 827 is fixedly connected with the drive shaft 829 of a vane type pneumatic motor 283. The pneumatic motor 283 has a cover 830 and a bottom wall 831 which are respectively connected by screws 833 and 834 with a motor housing 835. A vane 839 of the motor 283 is connected by means of screws 837 to the drive shaft 829. As shown in FIG. 8, the vane 839 has a substantially C-shaped cross section. Sealing strips 840 and 841 are connected to the outer surface of the vane 839 and these sealing strips are pressed by corrugated springs 842 in sealing engagement with opposite faces of the motor housing. The interior of the C-shaped vane 839 is substantially filled with an insert 843 which is connected by screws 845 to the vane 839. The insert 843 is made from a lighter material than the vane 839 and serves essentially to reduce the dead space of the latter.

An upwardly extending guide sleeve 849 is fixed gy screws 850 to the cover 830. The guide sleeve 849 and portions of the outer face of the pneumatic motor 283 can axially glide in the sleeve 739, if the tightening screw 744 shown in FIG. 1 is loosened, in order to adjust the axial position of the pneumatic motor 283. During such adjustments, turning of the pneumatic motor 283 relative to the sleeve 739 is prevented by means of a key 854 which engages in a groove 853 of the sleeve 739 and a corresponding groove in the guide sleeve 849.

A gear case 855 is connected by screws 857 to the bottom wall 831 of the pneumatic motor. The lower end of the drive shaft 829 extends into this gear case 855 and carries therein a pinion 860 connected to the shaft by a set of conical locking rings 859.

The lower part of the drive illustrated in FIG. 6 is shown in FIG. 7. As shown therein, a gear 861 likewise turnably mounted in the gear case 855 meshes with the pinion 860, and a drive shaft 863 on which the gear 861 is mounted extends downwardly therefrom. The drive shaft 863 carries a crank 867 connected thereto by a set of conical locking rings 865. The crank 867 has a free forked end into which a lug 869 is engaged and which is turnably connected thereto by a bolt 870.

A pintle 873 is suspended in the gear case 855 and the position of the pintle relative to the gear case is secured by locating screws 874. The forked ends of the two sections 876 and 877 of the tongs 38 are turnably mounted on the pintle 873. One eye of an 8-shaped member 879 is connected to the lower end of the pintle 873 by a package of dished-springs 880. The other eye of the member 879 is mounted by means of a roller bearing 881 on the lower end of the drive shaft 863.

The bottom wall 883 of the gear case 855 is supported by means of a fine adjusting mechanism 885 arranged coaxial with the drive shaft 829 of the pneumatic motor 283 on the bracket 730 (see FIG. 1). In this way it is possible to carry out a fine adjustment of the vertical position of the tongs and the drive thereof, whereas the coarse adjustment is carried out by turning of the adjusting ring 727.

As shown in FIG. 8, a sector shaped member 887, fixedly connected to the motor housing 835, is provided in the interior thereof. The member 887 is sealed by means of sealing strips 889 and 890 against the drive shaft 829 and is provided with a pair of start cut outs 891 and 892 respectively arranged adjacent openings 894 and 895 in the motor housing 835. The openings 894 and 895 are arranged at different elevations and connecting nipples 897, only one of which is shown in FIG. 8, are threadingly connected into each of these openings. Depending whether compressed air is fed through the opening 894 or 895 into the interior of the motor housing, the shaft 829 will be turned in clockwise or counterclockwise direction.

Figure 9:
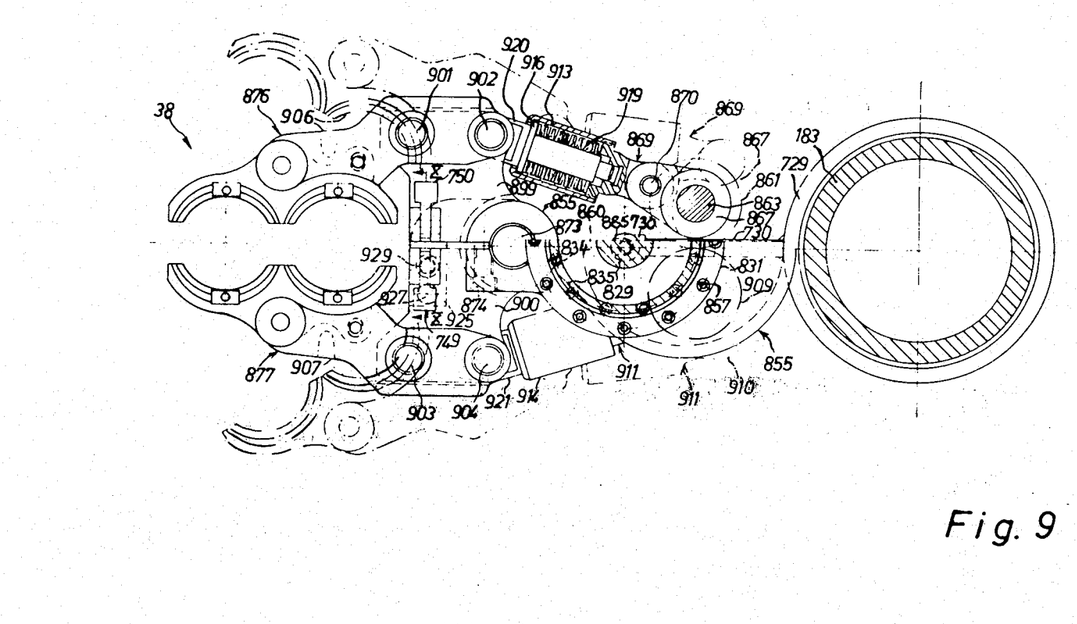
FIG. 9 is a partially sectioned top view of the tongs and elements cooperating therewith according to FIG. 7.

Each section 876 and 877 of the tongs 38 has a mounting portion 899, respectively 900 which, as shown in FIGS. 7 and 9, are turnably mounted with the forked ends thereof on the pintle 873. Members 906 and 907 are respectively fixedly connected to the mounting portions 899 and 900 by means of pins 901-904. Center piece halves similar to that shown in FIG. 1A may be suspended in the members 906 and 907. The members 906 and 907 are shown in full lines in FIG. 9 in their closed position and in dash-dotted lines in their open rest position.

The gear 861 connected to the drive shaft 863 meshes additionally with a gear 909 of equal size (FIG. 9) on the shaft of which a crank 867 corresponding to the crank 910 is connected on which a lug 869 corresponding to the lug 911 is turnably mounted. Each lug 869 and 911 comprises a hollow cylindrical housing 913, respectively 914, in which a piston 916 is axially movable. Each piston 916 is pretensioned with respect to its housing 913, respectively 914, by dished springs 919, and the piston rods 920 and 921 are turnably connected to the adjacent pin 902 or 904 of the sections 876 and 877 of the tongs coordinated therewith. The cranks 867 and 910 and the lugs 869 and 911 are shown in FIG. 9 in full lines in their position in which they hold the tongs 38 in closed position and in dash-dotted lines in their open rest position.

The axial pressure exerted by the dished springs 919 of the lug 869 onto the section 876 of the tongs is greater than the corresponding pressure produced by the springs of the lug 911. Therefore, the section 876 of the tongs will tend to turn the section 877 in counterclockwise direction beyond the position as shown in FIG. 9 in full lines. This, however, is prevented by a stop 925 (FIGS. 7 and 9) which is connected by a pin 927 and a screw 929 to an extension of the 8-shaped member 879. The section 876 of the tongs will be pressed by the springs in the lug 869 against the stationary stop 925 and therefore held in the desired end position. The other section 877 of the tongs is moved by the lug 911 against the section 876 and is thereby also properly positioned in its end position.

Each mounting portion 899 and 900 of the tongs carries, as shown in FIG. 10, one of the above-mentioned closure members 749 and 750. Each of these closure members comprises a closure arm 934, respectively 935, and each of these arms is turnably mounted intermediate its ends on a pin 931, respectively 932. The arms are normally held under the influence of pressure springs 937 and 938 against stop pins 939 and 940, respectively, so that the ends of these arms distant from the plane at which the two mounting portions 899 and 900 meet and are closer to the actuating claw 791, not shown in FIG. 10, than the inner ends thereof. During downward movement of the actuating means 747 (FIG. 4), the actuating claw 791 moves into engagement with the closure arms 934 and 935 and presses the outer free ends thereof downwardly. Since the span 796 of the claw is constant, there will result during downward movement of the claw oppositely directed horizontally extending force components which will press the mounting portions 899 and 900 and therewith the sections 876 and 877 of the tongs against each other so that the closing force of the tongs 38 is considerably increased.

The tongs on the second turntable, cf. the tongs 90 shown in FIG. 1A, may be constructed and driven in the same manner as the tongs 38. Thereby it is only necessary to mount in the members corresponding to the members 906 and 907 shown in FIG. 9 appropriate center pieces as shown at 91 and 92 in FIG. 1A instead of the center pieces used with the tongs 38. Evidently, it is also possible in the construction as shown in FIG. 1A to use double molds as shown in FIGS. 1–9 or triple molds or even a higher multiple of molds.

Figure 11:
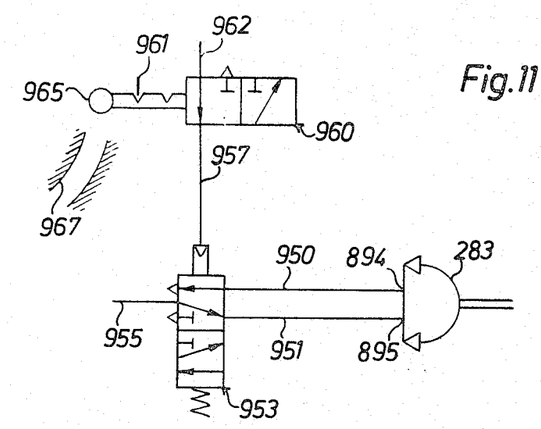
FIG. 11 schematically illustrates an arrangement for controlling the servomotor.

FIG. 11 schematically illustrates a control arrangement for controlling operation of the pneumatic servomotor 283 shown in FIG. 8. As shown in FIG. 11, the two openings 894 and 895 in the motor housing are connected by conduits 950 and 951 with a five-way, two-position valve 953 which receives compressed air from supply line 955. The valve 953 is controlled by a three-way, two position valve 960 which is connected to the valve 953 by a conduit 957 and which receives compressed air from a line 962. The control valve 960 may be releasably held in either of its two positions by a dog 961, schematically shown in FIG. 11. The dog cooperates with corresponding notches formed in the valve stem, the outer end of which carries a roller follower 965 which cooperates with and is guided in control cam tracks 967 only one of which is shown in FIG. 11.

The valve 960 as well as the valve 953 may be mounted for instance to move with the pneumatic motor 283 about the vertical axis 723 shown in FIG. 1 whereas the control cam tracks 967 may be stationarily or adjustably mounted on the machine frame extending about the axis 723. It is to be understood that the control cam tracks 967 are spaced from each other along the path of the roller follower 965 so as to operate the valve 960 and therewith the pneumatic motor 283 in timed sequence with the rotation of the turnable to thereby operate the tongs 38 in the desired manner. It is, therefore, not necessary that the control cam tracks 967 form a closed control cam track about the axis 723, but the control cam tracks 967 may comprise short track portions adjustably mounted on the machine frame as shown in FIG. 4 of our copending application Ser. No. 163,171 and cooperating with the roller follower 965 to operate the valve 960 and therewith the pneumatic motor in the desired timed sequence.

Figure 12:
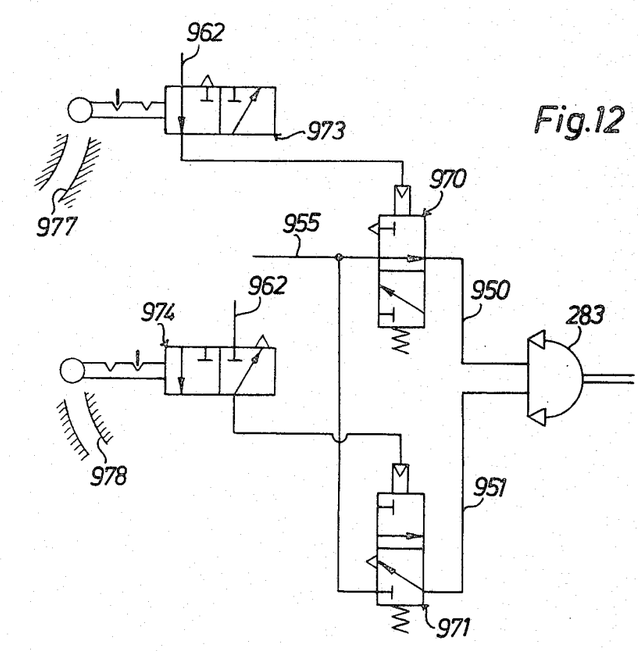
FIG. 12 schematically illustrates a different arrangement for controlling the servomotor.

FIG. 12 shows a modified control arrangement in which the conduits 950 and 951 are respectively connected to three-way, two-position valves 970 and 971 which are respectively connected to three-way, two-position valves 973 and 974 which in turn are supplied with compressed air by conduits 962 and controlled by control cam tracks 977 and 978 in a similar manner as described above in conntection with FIG. 11. The feed conduits 955 and 962 shown in FIGS. 11 and 12 may be connected to the respective valves by distributor arrangements as shown in FIG. 7 of our copending application Ser. No. 163,171.

The control arrangement shown in FIG. 12, while slightly more complicated than that shown in FIG. 11, has the advantage of saving compressed air.

While the control arrangement shown in FIGS. 11 and 12 have been described as connected to the pneumatic motor 283 for operation of the tongs 38, it is to be understood that such control arrangements may also be used for the operation of the tongs 71 and 90 shown in FIG. 1A as well as for the operation of the rams 61 in FIG. 1A and for the operation of the pneumatic motors 307 for vertical movement of the respective ram carrier 36 and the rams 35 connected thereto. Evidently it is also possible to use such control arrangements for motors producing the necessary vertical movement of the molds 83 shown in FIG. 1A as well as for the vertical movements of the mold housing 55 as shown in FIG. 1.

It will be understood that each of the elements described above, or two or more together may also find a useful application in other types of a drive for movable elements such as rams or tongs in a machine for making bottles from vitreous or plastic material differing from the types described above.

While the invention has been illustrated and described as embodied in a drive for movable elements such as rams or tongs in a machine for making bottles from vitreous or plastic material, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims

1. In a machine for making bottles or similar containers from plasticizable material, a combination comprising at least one movable element; a cam track extending along a predetermined path; cam follower means movable along said cam track and mechanically connected to said element for moving the latter in a predetermined direction by movement of the cam follower means along said cam track whereby during movement of said element by said cam follower means a load is applied to said cam follower means; moving means for causing movement of said cam follower means along said cam track and thereby moving said element in said predetermined direction; means for lowering the load on said cam follower means during movement thereof by said moving means along said cam track, said means comprising servomotor means also mechanically connected to said element in addition to said moving means for exerting a moving impulse on said element and thereby supporting movement of said element by said cam follower means in said predetermined direction; and means for controlling said servomotor means so that the latter supports movement of said element in said predetermined direction during movement of said element by said cam follower means along said cam track whereby the load applied to said cam follower means is reduced.

2. A combination as defined in claim 1 wherein said servomotor means comprises a rotary servomotor.

3. A combination as defined in claim 2, wherein said element comprises at least one elongated ram carrier movable in said predetermined direction, said servomotor means having a drive shaft, said cam follower means comprising a roller follower and means for connecting said roller follower with said drive shaft and with said ram carrier, and including guide means for guiding said ram carrier in said predetermined direction.

4. A combination as defined in claim 2, wherein said movable element comprises tongs having a pair of sections each movable about a pivot axis between an open and a closed position, said servomotor means has a drive shaft, said cam follower means comprises a roller follower and means for coupling said roller follower and said tongs with said drive shaft.

5. A combination as defined in claim 4 wherein said coupling means comprise gear means between said drive shaft and said tongs.

6. A combination as defined in claim 1, wherein said servo-motor means comprises a rotary vane type pneumatic motor.

7. In a machine for making bottles or similar containers from plasticizable material, a combination comprising at least one movable element comprising tongs having a pair of sections each movable about a pivot axis between an open and a closed position; a cam track extending along a predetermined path, said tongs and said cam track being movable relative to each other; support means supporting said cam track and tongs spaced in the direction of said pivot axis from each other; means for adjusting said spacing between said cam track and tongs; cam follower means movable along said cam track and cooperating with said tongs for moving the latter in a predetermined direction during movement of said tongs and said cam track relative to each other, resulting in a load applied to said cam follower means; servomotor means between said cam follower means and said tongs, said servomotor means having a drive shaft and said follower means comprising a roller follower and coupling means for coupling said roller follower and said tongs with said drive shaft and comprising a connecting shaft operatively connected to said roller follower to be turned about its axis during travel of said roller follower along said cam track, and means connecting said connecting shaft with the drive shaft for simultaneous rotation while permitting axial adjusting movement of said drive shaft and said connecting shaft relative to each other; and means for controlling said servomotor means to lower the load applied to said cam follower means.

8. A combination as defined in claim 7, wherein said coupling means further comprise a crank having a crank shaft extending substantially parallel to said drive shaft and a crank arm carrying said roller follower, said connecting shaft being arranged coaxially with said drive shaft, and said means connecting said connecting shaft and said drive shaft comprise a connecting sleeve coaxially fixed to one and surrounding the other of the two last-mentioned shafts, and cooperating spline means in said sleeve and said other shaft.

9. In a machine for making bottles or similar containers from plasticizable material, a combination comprising at least one movable element comprising tongs having a pair of sections each movable about a pivot axis between an open and a closed position; a cam track extending along a predetermined path, said tongs and said cam track being movable relative to each other; cam follower means movable along said cam track and cooperating with said tongs for moving the latter in a predetermined direction during movement of said tongs and said cam track means relative to each other, resulting in a load applied to said cam follower means; servomotor means having a drive shaft, said cam follower means comprising a roller follower and means for coupling said roller follower and said tongs with said drive shaft; a pair of cranks connected to said drive shaft to be driven by the latter in opposite directions; a pair of elongated lug means respectively pivotally connected at opposite ends to said pair of cranks and to said sections of said tongs, each of said lug means comprising axially extending pressure spring means for pressing said sections in the closed position against each other, one of said pressure spring means exerting a greater force than the other; stationary stop means cooperating 10. In a machine for making bottles or similar containers from plasticizable material, a combination comprising at least one elongated ram carrier movable in a predetermined direction; guide means for guiding said ram carrier in said predetermined direction; a cam track extending along a predetermined path, said ram carrier and said cam track being movable relative to each other; cam follower means movable along said cam track and cooperating with said ram carrier for moving the latter in predetermined direction during movement of said ram carrier and said cam track relative to each other, whereby said cam track applies a load to said cam follower means; and means for lowering the load on said cam follower means and comprising rotary servo motor means having a drive shaft, said cam follower means comprising a roller follower and means for connecting said roller with said drive shaft and said ram carrier and comprising a crank fixed to said drive shaft, a connecting rod pivotally connected at opposite ends to said crank and said ram carrier, an elongated toothed rack mounted for movement in longitudinal direction and carrying said roller follower, and a pinion fixed to said drive shaft and meshing with said rack, said load lowering means further comprising means for controlling said servo motor means so that the latter moves said ram carrier in said predetermined direction to thereby lower the load applied to said cam follower means.

11. In a machine for making bottles or similar containers from plasticizable material, a combination comprising at least one movable element; a cam track extending along a predetermined path; said element and said cam track being movable relative to each other; cam follower means movable along said cam track and cooperating with said element for moving the latter in a predetermined direction during movement of said element and said cam track relative to each other, whereby said cam track applies a load to said cam follower means; and means for lowering the load on said cam follower means and comprising rotary servo motor means between said cam follower means and said element, and means for controlling said servo motor means so that the latter moves said element in said predetermined direction to thereby lower the load applied to said cam follower means, said movable element comprising tongs having a pair of sections each movable about a pivot axis between an open and a closed position, said servo motor means having a drive shaft, and said cam follower means comprising a roller follower and means for coupling said roller follower and said tongs with said drive shaft and comprising a crank having a crank shaft and a crank arm carrying said roller follower and gear means between said crank shaft and said drive shaft.

12. A combination as defined in claim 11, wherein said coupling means further comprise gear means between said drive shaft and said tongs.

13. A machine for making bottles or similar containers from plasticizable material, a combination comprising at least one elongated ram carrier movable in a predetermined direction; guide means for guiding said ram carrier in said predetermined direction; a cam track extending along a predetermined path, said ram carrier and said cam track being movable relative to each other; cam follower means movable along said cam track and cooperating with said ram carrier for moving the latter in said predetermined direction during movement of said ram carrier and said cam track relative to each other, whereby said cam track applies a load to said cam follower means; means for lowering the load on said cam follower means and comprising rotary servo motor means between said cam follower means and said ram carrier, and means for controlling said servo motor means so that the latter moves said ram carrier in said predetermined direction to thereby lower the load applied to said cam follower means, said servo motor means having a drive shaft, said cam follower means comprising a roller follower and means for connecting said roller follower with said drive shaft and with said ram carrier; tongs having a pair of sections movable between an open and a closed position; an additional cam track extending along a second predetermined path; additional cam follower means movable along said additional cam track and cooperating with said sections for moving the latter between said open and said closed positions; additional servo motor means between said additional cam follower means and said sections to move the latter also between said open and said closed position; additional means for controlling said additional servo motor means in correspondence with the relative movement of said tongs and said additional cam track; actuating means on said ram carrier; and closure means on said sections cooperating with said actuating means for pressing said sections against each other during movement of said carrier.

14. A combination as defined in claim 13 wherein said actuating means comprises a claw, means mounting said claw on said ram carrier for movement in longitudinal direction of the latter, and resilient means cooperating with said mounting means for yieldably maintaining said claw in a predetermined position relative to said carrier.

15. A combination as defined in claim 14 and including means mounting said claw adjustable in the longitudinal direction of said carrier on said mounting means.

16. A combination as defined in claim 13 wherein said closure means comprises a pair of closure arms respectively pivotably mounted between the ends thereof on said sections in a direction transverse to a plane at which said sections meet in the closed position thereof, and resilient means for yieldably maintaining said arms in the position in which the ends thereof distant from said plane are closer to said actuating means than the other ends thereof, said arms forming with said actuating means a toggle arrangement.

17. A machine for making bottles or similar containers from plasticizable material, a combination comprising at least one movable element; a cam track extending along a predetermined path, said element and said cam track being movable relative to each other; cam follower means movable along said cam track and cooperating with said element for moving the latter in a predetermined direction during movement of said element and said cam track relative to each other, resulting in a load applied to said cam follower means; servo motor means comprising a rotary vane-type pneumatic motor between said cam follower means and said element; and means for controlling said servo motor means to lower the load applied to said cam follower means, said means for controlling said servo motor means comprising control track means extending substantially parallel to said predetermined path, valve means movable with said servo motor means relative to said control track means, and follower means movable along said control track means and cooperating with said valve means for actuating the latter in timed sequence during movement of said follower means on said control track means.

18. In a machine for making bottles or similar containers from plasticizable material, a combination comprises at least the elongated ram carrier movable in a predetermined direction; guide means for guiding said ram carrier in said predetermined direction; a cam track extending along a predetermined path, said ram carrier and said cam track being movable relative to each other; cam follower means movable along said cam track and cooperating with said ram carrier for moving the latter in said predetermined direction during movement of said ram carrier and said cam track relative to each other, whereby said cam track applies a load to said cam follower means; means for lowering the load on said cam follower means comprising rotary servo motor means between said cam follower means and said ram carrier, and means for controlling said servo motor means so that the latter moves said ram carrier in said predetermined direction to thereby lower the load applied to said cam follower means, said servo motor means having a drive shaft, said cam follower means comprising a roller follower and means for connecting said roller follower with said drive shaft and with said ram carrier; tongs having a pair of sections movable between an open and a closed position; an additional cam track extending along a second predetermined path, said tongs and the additional cam track being movable relative to each other; additional cam follower means movable along said additional cam track and cooperating with said sections for moving the latter between said open and said closed positions; additional servo motor means between said additional cam follower means and said sections to move the latter also between said open and said closed positions; additional means for controlling said additional servo motor means in correspondence with the relative movement of said tongs and said additional cam track; a turntable having an axis and being turnable about its axis, said tongs, said ram carrier and both of said servo motor means being connected to said turntable for movement therewith about the axis of the latter; and stationary support means stationarily supporting said cam track and said additional cam track extending about the axis of said turntable.

* * * * *